Figure 1:
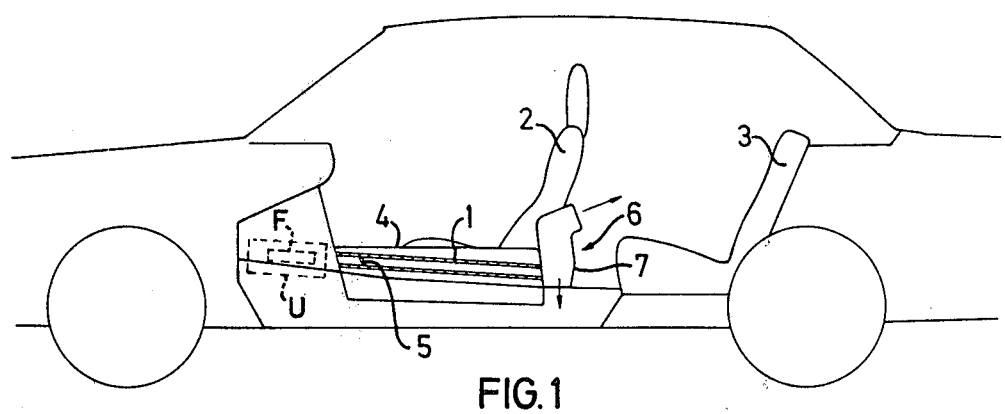

United States Patent [19]

Lundström

[11] 4,343,230
[45] Aug. 10, 1982

[54] AUXILIARY DEVICE FOR CLIMATE-CONTROL UNITS IN MOTOR VEHICLES

[75] Inventor: Gustaf B. Lundström, Göteborg, Sweden

[73] Assignee: AB Volvo, Göteborg, Sweden

[21] Appl. No.: 112,323

[22] Filed: Jan. 15, 1980

[30] Foreign Application Priority Data

Jan. 25, 1979 [SE] Sweden ............................. 7900680

[51] Int. Cl.³ .............................................. B60H 1/00
[52] U.S. Cl. ............................................ 98/2.05; 98/2
[58] Field of Search ................ 98/2, 2.03, 2.05, 2.06, 98/2.07, 2.08; 296/208; 165/43

[56] References Cited

U.S. PATENT DOCUMENTS

| 2,718,839 | 9/1955 | Wilfert | 98/2.03 X |
|---|---|---|---|
| 2,882,809 | 4/1959 | Nelson | 98/2.05 |
| 3,211,076 | 10/1965 | Chancellor et al. | 62/244 X |
| 3,278,121 | 10/1966 | Komenda | 98/2.05 X |
| 3,444,700 | 5/1969 | Beyer | 55/DIG. 29 |
| 3,661,069 | 5/1972 | Grosseau | 98/2.05 |
| 3,732,801 | 5/1973 | Wallis | 98/2.05 |
| 3,814,314 | 6/1974 | Morden | 98/2.05 X |
| 3,919,926 | 11/1975 | Yamada | 98/2.03 |

FOREIGN PATENT DOCUMENTS 1042902 11/1953 France ................................... 98/2

*Primary Examiner*—Albert J. Makay
*Assistant Examiner*—Harold Joyce
*Attorney, Agent, or Firm*—Young & Thompson

[57] ABSTRACT

An auxiliary device for climate-control units in motor vehicles. The device is coupled to an air duct leading from the fan of the unit to the floor space in front of the back seat. The device comprises a fan which draws air through the duct and blows it out into the passenger space in front of the back seat.

3 Claims, 3 Drawing Figures

AUXILIARY DEVICE FOR CLIMATE-CONTROL UNITS IN MOTOR VEHICLES

The present invention relates to an auxiliary device for climate-control units in motor vehicles comprising a fan means, to the exhaust side of which fan means ducts are connected which conduct air both to the space in front of the front seat of the vehicle and to the space between the front seat and the back seat.

The problem with climate-control units for motor vehicles, i.e. units for heating and/or cooling air drawn in from the outside, is that it is difficult to achieve the same climatic comfort in the back seat as in the front seat. This is especially true for cooling of incoming outside air. For example, a setting of the unit which provides just the right temperature and maximum comfort in the front seat results in higher temperatures and poorer comfort in the back seat. This is a result of the fact that the fan means of the unit requires ducts to the back seat which have relatively large flow cross-sections so that the resistance to flow will not be too great, resulting in too small a supply of air to the back seat. Large ducts and low flow velocity result, however, in substantial heating of the cold air (or, conversely, cooling of the heated air). One method of solving this problem is to provide the unit with a fan means with very high capacity so as to permit reduction of the flow cross-sectional area and increasing the air-flow rate. This results, however, in increased costs and creates problems for installation because of the greater space requirements.

The purpose of the present invention is to obviate the above-mentioned disadvantages and achieve an auxiliary device which makes it possible to increase the climate comfort in the back seat.

This is achieved according to the invention by means of an auxiliary device which has a housing with at least one inlet, which is arranged to be connected to at least one duct which conducts air from the fan means of the unit to the space between the front and back seats, and at least one outlet, said housing containing an electrically driven fan whose suction side faces the inlet of the housing and whose discharge side faces the outlet of the housing.

The auxiliary device according to the invention provides an increased amount of air to the back seat at reasonable cost. The air can be conducted at high speed in narrow ducts, resulting in reduced cold-loss (or heat-loss). The device can be provided with manual controls so that the back seat passengers can themselves adjust the amount and the distribution of the air. An essential advantage of an auxialiary device is that it can be designed in such a way that it can be installed as an extra accessory in existing vehicles. Another advantage is that in vehicles, which are made in both simple and more exclusive versions, the fan means of the standard unit need not be overdimensioned in the simple version. Instead, all the versions are provided with the same type of standard unit and only the more exclusive versions are provided with an auxiliary device.

Figure 2:
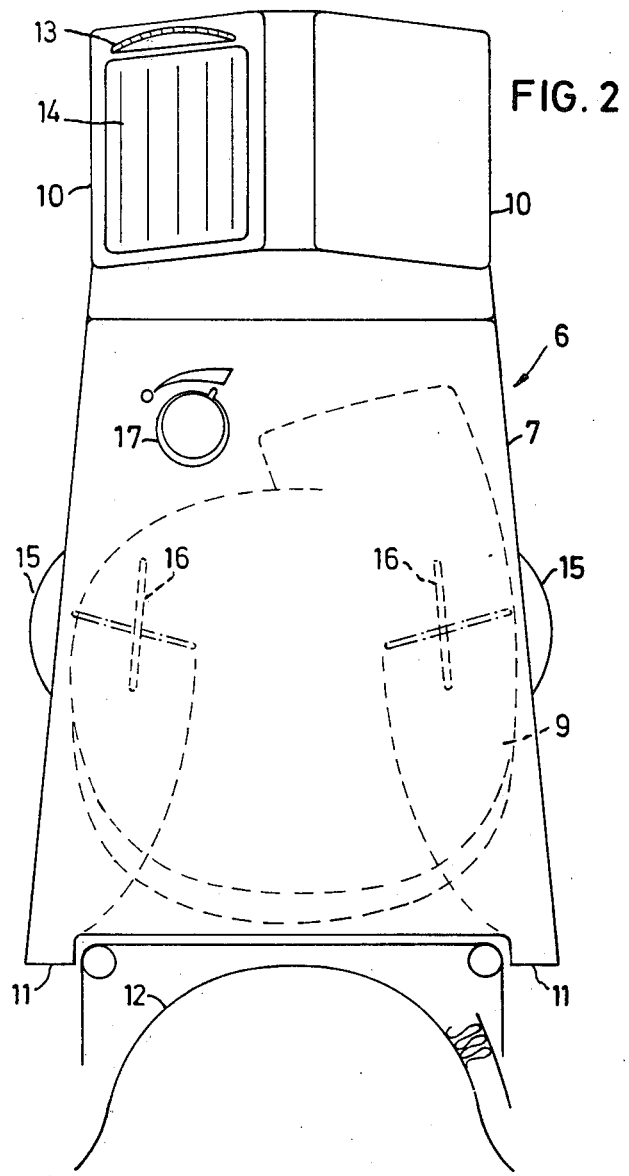
Figure 3:
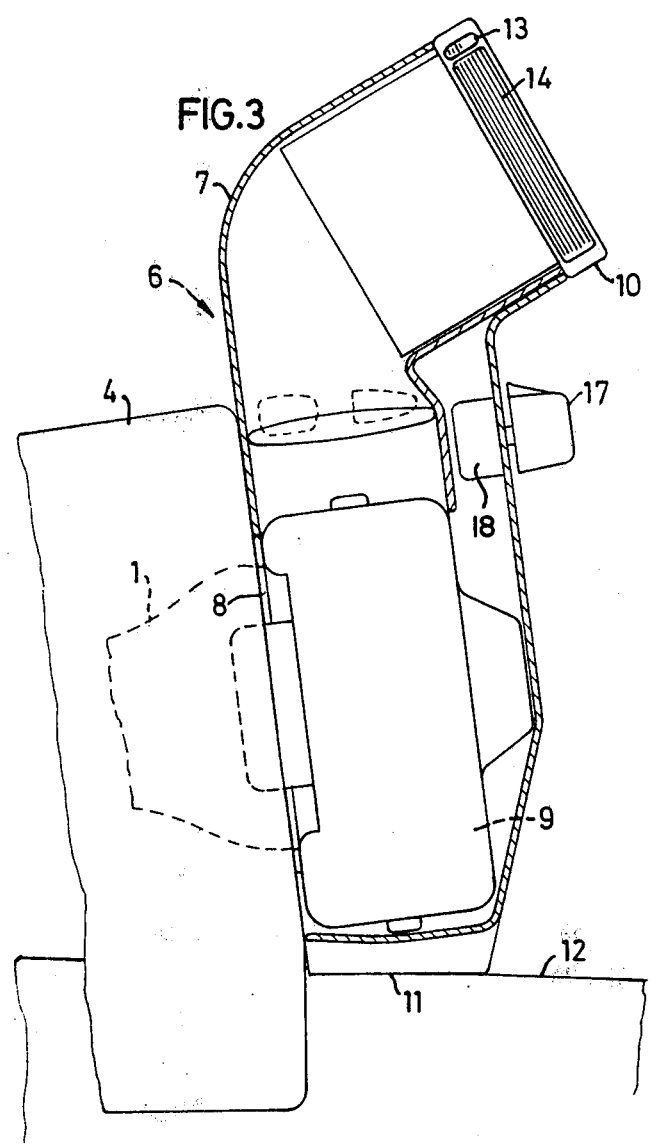

The invention will be described below in more detail with reference to an example shown in the attached drawings, in which FIG. 1 shows a schematic side view of an auxiliary device in a passenger car, FIG. 2 a frontal view of the auxiliary device, and FIG. 3 a cut-away side view of the device in FIG. 2.

The car shown in FIG. 1 has in the front, under the instrument panel, a climate control unit U known per se and not shown in more detail here, which can be a unit solely for heating air drawn in from the outside or a device for alternatively heating or cooling. an air duct 1 extends from the exhaust side of the fan means F thereof between the front seats 2 to the floor space in fron of the back seat 3. The duct 1 runs in a console 4 between the seats 2 and has a manually adjustable damper 5, by means of which the amount of air through the duct 1 can be regulated.

At the rear wall of the console 4, an auxiliary device 6 according to the invention is mounted. The device 6 comprises a housing 7 with an inlet opening 8 into which the duct 1 opens. Inside the housing 7 there is a fan 9 whose suction side faces the opening 8. The fan can be of a type known per se and is therefore only shown schematically. The air sucked in by the fan 9 is blown out through two obliquely upwardly directed vents 10 which form an obtuse angle with each other, and two downwardly directed vents 11 on either side of the drive shaft tunnel 12 of the car. With the aid of a wheel 13 the flow-through area of a damper 14 in each vent 10 can be regulated to set the desired amount of upwardly directed air. In a corresponding manner, the desired amount of downwardly directed air can be set by means of wheels 15 which control dampers 16 in ducts to the vents 11. In this way, the back seat passengers can themselves achieve the desired distribution of upwardly and downwardly directed air for the greatest comfort. The total amount of air can be varied by varying the r.p.m. of the fan, which can be accomplished with the aid of a rheostat 18 which is coupled to the fan motor and which has an adjusting knob 17 and incorporates an off/on switch. The housing can also contain an additional damper (not shown), by means of which the air supply to the lower vents 11 can be cut off completely. This damper can, for example, be coupled to the knob 17 in such a manner that it opens and closes with a limited axial movement of the knob 17.

The device 6 described can be modified in several different ways within the scope of the invention for adaptation to various type of vehicles and climate-control installations. For example, it can be provided with two inlets for connection to air ducts under each front seat.

What I claim is:

1. In a motor vehicle, in combination, a climate-control unit including fan means to the exhaust side of which ducts are connected with conduct air both to the space in front of the front seat of the vehicle and to the space between the front seat and the back seat, and an auxiliary device comprising a housing with at least one inlet, which is connected to at least one duct which conducts air from said fan means to the space between the front and back seats, and at least one outlet, said housing containing an electrically driven fan whose suction side faces the inlet of the housing and whose discharge side faces the outlet of the housing, said housing outlet having at least one outlet vent which is arranged to produce an air flow towards the floor of the vehicle, and at least one outlet vent which is arranged to produce an air flow directed towards the back seat, said housing being provided with manually adjustable damper members for regulating the distribution of air between said vents and with manually adjustable means for starting and stopping the fan and for manual adjustment of the r.p.m. of the fan.

2. The combination according to claim 1, characterized in that the housing is affixed to a rear wall of a console arranged between two front seats.

3. The combination according to claim 2, characterized in that the inlet of the housing is connected to an air duct running through the console.

* * * * *